US012798446B2

(12) United States Patent
Mayer et al.

(10) Patent No.: US 12,798,446 B2
(45) Date of Patent: Nov. 17, 2026

(54) SEAT AND SEAT ASSEMBLY FOR A VEHICLE

(71) Applicant: Adient US LLC, Plymouth, MI (US)

(72) Inventors: Thomas Mayer, Radevormwald (DE); Karthikeyan Maharajapuram Subramanian, Leverkusen (DE); Arkadius Rock, Soligen (DE); Jozef Galko, Trencin (SK); Andrej Medved, Trencin (SK); Kirubaharan Albert Reginold, Burscheid (DE); Mark Thomas Prosch, Soligen (DE); Norbert Heeg, Dahn (DE); Stephan WItte, Essen (DE)

(73) Assignee: Adient US LLC, Plymouth, MI (US)

(*) Notice: Subject to any disclaimer, the term of this patent is extended or adjusted under 35 U.S.C. 154(b) by 141 days.

(21) Appl. No.: 18/716,542

(22) PCT Filed: Dec. 7, 2022

(86) PCT No.: PCT/IB2022/061859
§ 371 (c)(1),
(2) Date: Jun. 5, 2024

(87) PCT Pub. No.: WO2023/105423
PCT Pub. Date: Jun. 15, 2023

(65) Prior Publication Data

US 2025/0026248 A1 Jan. 23, 2025

(30) Foreign Application Priority Data

Dec. 7, 2021 (DE) ..................... 10 2021 213 927.2
Apr. 6, 2022 (DE) ..................... 10 2022 203 440.6

(51) Int. Cl.
*B60N 2/02* (2006.01)
*B60N 2/07* (2006.01)

(52) U.S. Cl.
CPC ......... *B60N 2/0224* (2013.01); *B60N 2/0264* (2023.08); *B60N 2/0722* (2013.01)

(58) Field of Classification Search
CPC ... B60N 2/0224; B60N 2/0264; B60N 2/0722
See application file for complete search history.

(56) References Cited

U.S. PATENT DOCUMENTS 7,597,292 B2 * 10/2009 Kayumi ............... B60N 2/0705 248/157
11,332,043 B2 * 5/2022 Line ..................... B60N 2/0226
(Continued)

FOREIGN PATENT DOCUMENTS

CN 105283348 A 1/2016
CN 106794782 A 5/2017
(Continued)

OTHER PUBLICATIONS

European Patent Office, International Search Report and Written Opinion in Application No. PCT/IB2022/061859, dated Mar. 3, 2023, 9 pages, Rijswijk, Netherlands.
(Continued)

*Primary Examiner* — Eret C Mcnichols
(74) *Attorney, Agent, or Firm* — Marshall & Melhorn, LLC

(57) ABSTRACT

A seat may have a seat longitudinal adjustment device having two rail pairs. The rail pairs may each have a lower rail and an upper rail. A contacting device is provided at least for electrically connecting a drive unit and a number of seat components to at least one control unit and to an electrical power supply unit. The contacting device may have at least one plug having a number of contact pins and/or contact elements, and a socket having a number of corresponding mating contact elements. When the plug is inserted into the socket, at least the electrical connection is established between the electrical power supply unit and the at least one (Continued)

control unit and the drive unit for the seat longitudinal adjustment device and the seat components. The contacting device may have at least one positioning element and/or one short-circuit element.

16 Claims, 11 Drawing Sheets

(56) References Cited

U.S. PATENT DOCUMENTS

| | | | | |
|---|---|---|---|---|
| 12,300,983 | B2 * | 5/2025 | Ji | B60R 16/027 |
| 2006/0185879 | A1 | 8/2006 | Kayumi | |
| 2013/0316572 | A1 | 11/2013 | Ishikawa et al. | |
| 2021/0053467 | A1 * | 2/2021 | Aktas | B60N 2/0732 |
| 2021/0053468 | A1 * | 2/2021 | Aktas | B60N 2/067 |
| 2021/0078510 | A1 * | 3/2021 | Line | B60N 2/0705 |
| 2024/0190317 | A1 * | 6/2024 | Heeg | H01R 13/62938 |
| 2025/0018834 | A1 * | 1/2025 | Heeg | B60N 2/0264 |

FOREIGN PATENT DOCUMENTS

| | | | | |
|---|---|---|---|---|
| CN | 107980029 | | 5/2018 | |
| DE | 19809801 | A1 | 9/1999 | |
| DE | 102006021884 | B3 | 10/2007 | |
| DE | 102012013688 | A1 * | 1/2014 | H01R 13/64 |
| DE | 102021101394 | A1 | 7/2021 | |
| DE | 102021104049 | A1 | 8/2021 | |

OTHER PUBLICATIONS

China National Intellectual Property Administration, Office Action in Application No. CN202280080702.8 dated Aug. 12, 2026, 11 pages, with English Translation of pages of 3-5.

* cited by examiner

SEAT AND SEAT ASSEMBLY FOR A VEHICLE

FIELD

The invention relates to a seat having a drive unit, wherein the seat comprises at least one longitudinal seat adjustment device having two rail pairs for longitudinally adjusting the seat, wherein the rail pairs each have a lower rail and an upper rail and the upper rail is movable relative to the lower rail. The invention further relates to a seat arrangement having at least one such seat.

BACKGROUND

A longitudinal seat adjustment device for at least one vehicle seat in a vehicle generally comprises two rail pairs which are arranged with spacing from each other. In this case, the respective rail pair has a lower rail arranged in a manner secured to a vehicle and an upper rail which is partially guided therein relative to the lower rail. The longitudinal seat adjustment device is configured, for example, in an electrical manner. To this end, for example, the longitudinal seat adjustment device comprises an adjustment unit and a drive unit for electrically driving the adjustment unit. A power supply to the drive unit is carried out in this instance via at least one connection cable, in particular a power cable.

An object of the present invention is to provide a seat having an improved longitudinal seat adjustment device, in particular an easily removable seat, and a seat arrangement having at least one such seat in a vehicle.

The object is achieved according to the invention by a seat and by a seat arrangement which have the features set out in the claims described herein.

SUMMARY

A seat according to the invention has a drive unit, wherein the seat comprises at least one longitudinal seat adjustment device having two rail pairs for longitudinally adjusting the seat, wherein the rail pairs each have a lower rail and an upper rail and the upper rail is movable relative to the lower rail. Furthermore, there is provided a contacting apparatus, in particular a contacting apparatus in the form of a plug/socket arrangement, for electrically connecting the drive unit, a number of, particularly electronic, seat components, such as sensors, actuating drives, at least one, particularly remote, control unit, for example, a control device, and/or an electrical energy supply unit, for example, a battery and/or an on-board network. The contacting apparatus comprises as complementary components at least one plug having a number of connection contacts, in particular having a number of contact pins and/or contact elements, and one socket having a number of corresponding contact counter-elements which are formed, for example, from an electrically conductive material for producing an electrical connection. The socket is arranged on the movable upper rail and the plug is arranged on the seat, or vice versa.

When the plug is inserted in the socket, at least one electrical connection of the drive unit and/or a number of, particularly electronic, seat components can be or become produced with at least one control unit and/or an electrical energy supply unit. Furthermore, the contacting apparatus comprises in a region between the plug and socket at least one positioning element and/or a short-circuit element.

The term "region between the plug and socket" (also referred to as an intermediate region) is particularly intended to be understood to be the region in which the positioning element engages in a positioning receiving member before the contact connections engage one in the other.

The term "contacting region between the plug and socket" is particularly intended to be understood to be the region in which the contacting connections engage one in the other, in particular contact each other, when the plug is inserted in the socket or vice versa.

The term "complementary components" is particularly intended to be understood to be components which mutually complement each other in order to form the contacting apparatus, such as the plug and socket. For example, contact pins, such as, for example, studs, in particular contact pins which project perpendicularly from the plug, and/or contacting elements, such as, for example, resilient elements, contact springs, contact clamps, a wall portion or the like, are provided as contact connections of the plug, in particular contact elements which project perpendicularly from the plug.

In particular, a technical signal connection of different components remote from the seat and near the seat, for example, between the drive unit and electronic seat components, on the one hand, as components which are near the seat or arranged on the seat and the electrical energy supply unit and/or the at least one control unit, on the other hand, as components which are remote from the seat, in particular arranged in the vehicle, can be produced by means of the contacting apparatus.

For example, at least one or more of the following components, in particular the at least one drive unit, the at least one electronic seat component, the at least one energy supply unit and/or the at least one control unit, can be arranged directly on the seat and at least one other component or the other components can be arranged remote from the seat in the vehicle, or vice versa.

The contacting apparatus is used particularly for electrical connection, in particular of a cable connection, between the above-mentioned different components. The contacting apparatus can also be referred to as the cable connection unit.

The advantages achieved with the invention particularly involve a comparatively simple removal of the seat from the vehicle or a 180° rotation of the electrically operated seat in the vehicle being possible by means of the contacting apparatus by the plug type connection between the plug and socket of the contacting apparatus being able to be released separately before the removal or rotation of the seat. A re-production of the electrical connection can be achieved in reverse in that the plug can be inserted into the socket.

By means of the contacting apparatus, consequently, it is possible to separate the electrical connection between components remote from the seat, such as, for example, an on-board vehicle network or a battery, and components which are near the seat or arranged on the seat, such as the drive unit and/or electronic seat components, where applicable, for example, in order to rotate the vehicle seat or by removing it from the vehicle without it being necessary to visit a workshop with the vehicle.

The contacting apparatus has the at least one positioning element, by means of which it is possible in a comparatively simple manner to produce the plug type connection between the plug and socket. In this case, the positioning element assists in positioning the plug relative to the socket, or vice versa, and in inserting the plug into the socket. In particular, the positioning element is used for correct orientation so that, in the assembled state of the plug and socket, a correct connection, in particular a correct electrical connection and/or a predetermined position relative to each other, is produced. The at least one positioning element is used for reliable assembly, particularly when assembling the plug and the socket, and consequently a reliable electrical connection when connecting the electrical and/or technical signal connection.

The positioning element (also called a position element or orientation element) may, for example, be in the form of a pin or stud, in particular a locating pin or locating stud.

By means of the short-circuit element which is arranged on the contacting apparatus, a risk of short-circuits of the contacting unit and consequently of the longitudinal seat adjustment device can be substantially reduced. In particular, the short-circuit element is in the form of a so-called short-circuit bar which is active in the non-inserted state of the plug and socket.

The positioning element is insertable, particularly pluggable, particularly in at least one positioning receiving member. The positioning receiving member (also referred to as an orientating receiving member) may, for example, be in the form of a hole, a receiving member, a slot, in particular a locating hole, a locating receiving member or a locating slot.

In an exemplary embodiment, the plug and/or socket has/have the at least one positioning element so that the assembly, in particular the joining of the plug and socket of the contacting apparatus is possible in a simplified and reliable manner.

In another embodiment, the positioning element is arranged at a narrow side of the plug and/or the socket in order to simplify the joining of the plug and socket and to allow it in a relatively reliable manner.

For example, the plug or the socket may comprise two positioning elements, wherein the respective positioning element is arranged at a narrow side of the plug or the socket. In this case, the two positioning elements are arranged opposite each other on the plug or socket. By means of the two positioning elements, an orientation of the plug relative to the socket and an insertion direction of the plug with respect to the socket are predetermined so that an incorrect handling during production of the plug type connection between the plug and socket can be excluded to the greatest possible extent.

The at least two positioning elements can further be arranged and/or orientated asymmetrically or symmetrically relative to the contact connections of the plug and/or the socket. The at least two positioning elements can also be configured differently, in particular have a different diameter or a different length.

The at least one positioning element which projects from the plug or socket, particularly perpendicularly, can be configured to be higher by a distance, in particular a predetermined distance (also referred to as an excess dimension) with respect to the contact connections which project from the plug. This distance or excess dimension of the at least one positioning element may be configured so that engagement and guiding of the at least one positioning element in the positioning receiving member is provided in the region between the plug and socket before the contact connections engage in each other, particularly before the contact connections contact.

Furthermore, the positioning element of one of the complementary components, particularly either of the plug or the socket, can be formed in a chamfered manner at an end which faces the other complementary component. The introduction or insertion of the positioning element in the positioning receiving member is thereby improved.

The at least one positioning element may be configured, for example, to be so high that it forms an extension of the corresponding narrow side. There may further be provision for the at least one positioning element to be configured to be at least of the same height as the contact pins and contact elements of the plug and/or the contact counter-elements of the socket. Consequently, it is possible to avoid as far as possible an electrical contact being produced between the plug and the socket when the plug and socket are incorrectly orientated relative to each other.

Alternatively, the at least one positioning element can also be in the form of a recess, hole and/or counter-element in order to simplify handling of the plug and socket.

Furthermore, the plug and/or socket is/are configured in such a manner that a possible offset of individual mutually corresponding components of the socket and plug can be compensated for by means of the positioning elements in order to produce the electrical connection.

One possible further development makes provision for the respective positioning element to be configured in a circular-arc-like manner with a circular arc opening which is directed in the direction of the contact pins and contact elements and/or the contact counter-elements.

The plug can, for example, have two contact pins as contact connections as electrical poles for closing an electrical current circuit if the plug is inserted in the socket and consequently the electrical connection is produced. In this case, the two contact pins have greater dimensions with respect to the respective circumference than additional contact pins of the plug. Furthermore, the two contact pins are each arranged in the region of the opposite narrow sides of the plug. It is also conceivable for at least one of the two contact pins for the orientated positioning of the plug relative to the socket to be in the form of a positioning element or to form the positioning element. In this instance, therefore, at least one contact pin acts as an auxiliary positioning member, that is to say, as a positioning element.

The plug and the socket can be connected to each other in a force-fitting and/or form-fitting and releasable manner by means of the contact connections in the inserted state. Alternatively or additionally, the plug and socket can be releasably connected to each other by means of a releasable screw connection or a rapid-fit connection, such as a snap-fit connection or a clamping connection.

In one configuration of the contacting apparatus, it has at least one short-circuit element which has at least one short-circuit bar pin and consequently a so-called short-circuit bar can be obtained. In particular, such a short-circuit bar is formed by means of two short-circuit bar pins. In this case, these short-circuit bar pins have with respect to the height thereof dimensions which are selected so that the short-circuit bar is closed and thereby active until pole contacts of the plug and the socket are closed electrically correctly and completely. Then, the short-circuit bar opens so that electric current can flow via the pole contacts. As long as the short-circuit bar is closed, a current circuit between the pole contacts is not closed and consequently no electrical connection between the components can be produced.

In another embodiment, the plug has a rotation prevention member which corresponds to a rotation prevention counter-member of the socket so that an orientation of the plug during insertion thereof into the socket is predetermined. By means of the rotation prevention member, therefore, it is possible to the greatest extent possible to exclude a situation in which the plug can be inserted into the socket in a manner other than the predetermined one. Consequently, the connection between the plug and socket can also be produced if a person who is producing the plug type connection does not have any knowledge in this regard.

A further development of the contacting apparatus has as contact counter-elements of the socket a number of flexible metal elements. These flexible metal elements are arranged and/or configured in such a manner that the metal elements contact the contact pins and/or contact elements in a pretensioned manner when the plug is inserted in the socket. As a result of the pretensioning, a contacting between the metal elements, in particular in the form of metal plates, the socket and the contact pins and contact elements of the plug can be produced in an optimized manner.

Furthermore, the width and flexibility of the metal elements of the socket are used for tolerance compensation in order to ensure the electrical contact between the contact pins and the contact elements and the associated metal elements of the socket.

Another possible embodiment of the socket of the contacting apparatus makes provision for a lower side of the socket, that is to say, a side opposite the metal elements, to be configured to be at least partially open so that, for example, accumulations of dust within the socket can be avoided as far as possible. In particular, the contacting apparatus is configured to be sealed so that an electrical contact region between the plug and socket is protected from dust introduction and introduction of spray water.

The invention further relates to a seat arrangement having at least one seat, in particular vehicle seat, having a longitudinal seat adjustment device having two rail pairs for positioning the seat along the rail pairs, and having a contacting apparatus which comprises a socket and a plug having a number of contact pins and contact elements, wherein the socket is arranged on the movable upper rail and the plug is arranged on the seat and, when the plug is inserted in the socket, at least one electrical connection between an on-board network and a drive unit for the longitudinal seat adjustment device is produced.

In such a seat arrangement, it is possible for the at least one seat to be able to be removed comparatively simply out of the vehicle or rotated through 180° in the vehicle by the plug type connection between the plug and socket of the contacting apparatus being released. The electrical connection is re-produced when the plug is again inserted in the socket. The contacting apparatus allows the electrical connection between the on-board network and the drive unit to be separated when necessary, for example, in order to rotate the vehicle seat or when removing it from the vehicle, and to be re-produced without it being necessary to bring the vehicle to a workshop.

DESCRIPTION OF THE FIGURES

Exemplary embodiments of the invention are explained in greater detail with reference to the drawings, in which.

DETAILED DESCRIPTION

Figure 1:
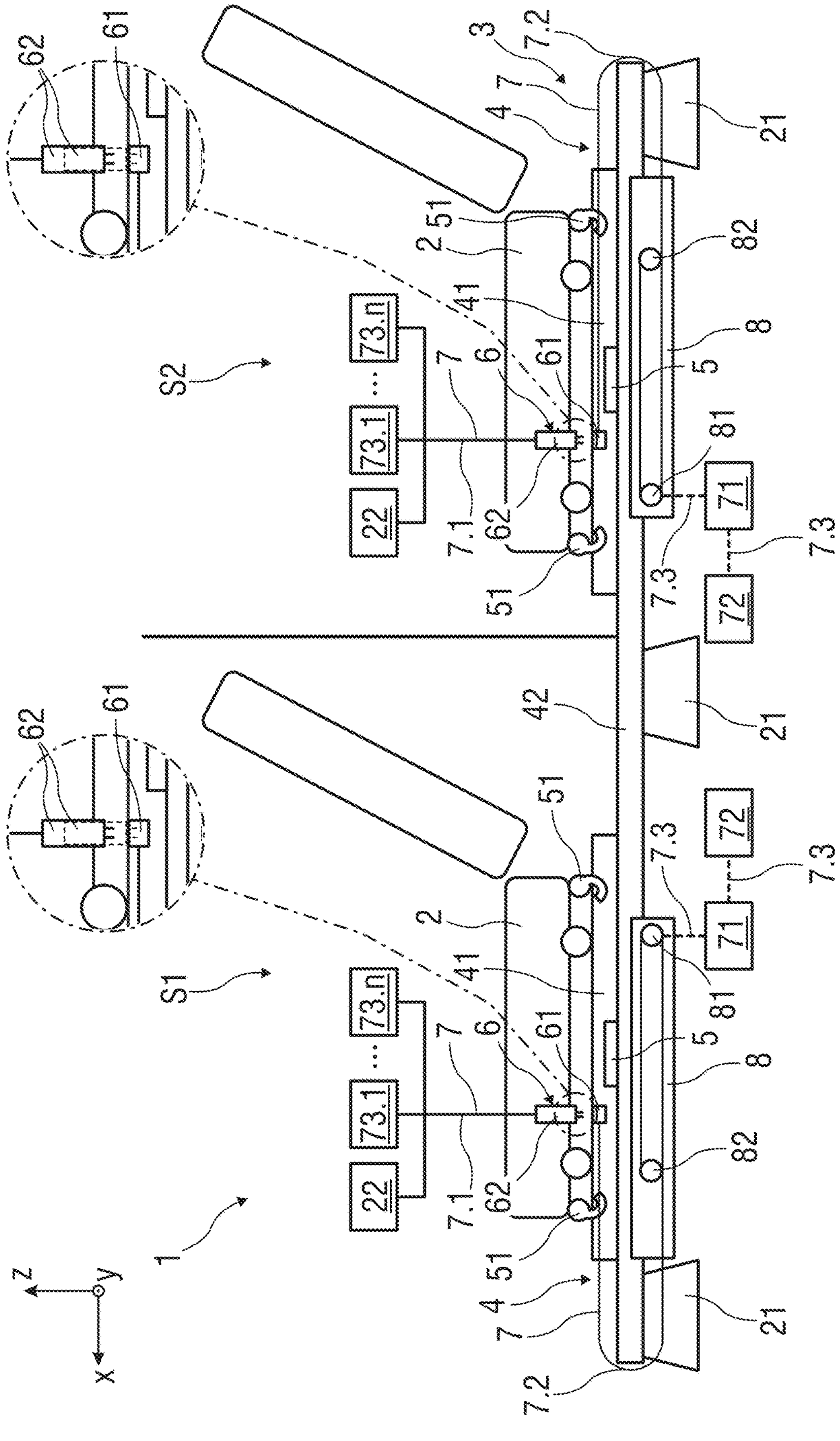
FIG. 1 schematically shows a cutout of a vehicle with a second seat row and a third seat row in which at least one seat is arranged, FIG. 2 schematically shows a number of components of a longitudinal seat adjustment device for a plurality of seats of a seat arrangement, FIG. 3 schematically shows a view of a contacting apparatus which is formed from a plug and socket in a first embodiment in the non-inserted state, FIG. 4 schematically shows a view of the socket in the first embodiment of the contacting apparatus, FIG. 5 schematically shows a view of the plug in the first embodiment, FIG. 6 schematically shows a perspective view of the plug which is spaced apart from the socket in the first embodiment, FIG. 7 schematically shows a perspective view of the plug in the first embodiment, FIG. 8 schematically shows a partially transparent view of the contacting apparatus in the first embodiment with a plug inserted in the socket, FIG. 9 schematically shows a view of the contacting apparatus in a second embodiment in the non-inserted state, FIG. 10 schematically shows a view of the socket in the second embodiment of the contacting apparatus, FIG. 11 schematically shows a view of the plug in the second embodiment, FIG. 12 schematically shows a perspective view of the plug, which is spaced apart from the partially transparently illustrated socket, in the second embodiment, FIG. 13 schematically shows a perspective view of the plug in the second embodiment, FIG. 14 schematically shows a view of the contacting apparatus in the second embodiment with a plug which is inserted in the partially transparently illustrated socket, FIG. 15 schematically shows a cutout of a partially sectioned illustration of a rail pair of a longitudinal seat adjustment device with a plug and a socket in a third embodiment of the contacting apparatus, FIG. 16 schematically shows a plug in the third embodiment of the contacting apparatus, FIG. 17 schematically shows a plug in a fourth embodiment of the contacting apparatus, FIG. 18 schematically shows a cutout of a partially sectioned view of a rail pair of a longitudinal seat adjustment device with a plug and a socket in a fifth embodiment of the contacting apparatus, FIG. 19 schematically shows a plug in the fifth embodiment of the contacting apparatus, FIG. 20 schematically shows a plug in a sixth embodiment of the contacting apparatus, and FIG. 21 schematically shows a resiliently loaded contact pin of the contacting apparatus in the fifth or sixth embodiment.

Mutually corresponding components are denoted in all the Figures with the same reference numerals.

FIG. 1 shows a cutout of a vehicle 1 with a second seat row S1 and a third seat row S2 of a seat arrangement. A first seat row for a driver and a passenger is not illustrated.

There are illustrated two seats 2, in particular two vehicle seats 2 (referred to as vehicle seats 2 below), which are each arranged in a longitudinally displaceable manner in the vehicle 1 by means of a partially illustrated longitudinal seat adjustment device 3. The vehicle seats 2 may, for example, be in the form of individual seats or bench type seats.

The vehicle seat 2 which is schematically illustrated in FIG. 1 is described below using three spatial directions which extend perpendicularly to each other. A longitudinal direction x extends in a vehicle seat 2 which is fitted in the vehicle 1 substantially horizontally and preferably parallel with a longitudinal vehicle direction which corresponds to the usual travel direction of the vehicle 1. A transverse direction y which extends perpendicularly to the longitudinal direction x is also orientated horizontally in the vehicle 1 and extends parallel with a transverse vehicle direction. A vertical direction z extends perpendicularly to the longitudinal direction x and perpendicularly to the transverse direction y. In a vehicle seat 2 which is fitted in the vehicle 1, the vertical direction z preferably extends parallel with a vertical vehicle axis.

Positional indications and directional indications, such as, for example, front, rear, top and bottom, relate to a viewing direction of a passenger who is sitting in the vehicle seat 2 in a normal seat position, wherein the vehicle seat 2 is fitted in the vehicle 1, in a position for use suitable for conveying persons, with an upright backrest and being orientated in the travel direction, as usual. However, the vehicle seat 2 can also be fitted or moved in a different orientation, for example, counter to the travel direction.

The two vehicle seats 2 are arranged in particular on a vehicle body 21 by means of the longitudinal seat adjustment device 3. The invention can also be provided for an individual vehicle seat 2 with an associated longitudinal seat adjustment device 3.

The longitudinal seat adjustment device 3 comprises for each vehicle seat 2, for example, two rail pairs 4 which are arranged with spacing from each other in the longitudinal direction x. The respective rail pair 4 comprises an upper rail 41, also called a rail runner or seat rail, and a lower rail 42, also called a guide rail or base rail. In the exemplary embodiment, the lower rail 42 is in the form of a common lower rail 42 for two longitudinal seat adjustment devices 3 of two vehicle seats 2. Alternatively, the lower rail 42 can also be formed separately.

The upper rail 41 is arranged in a longitudinally adjustable manner on the lower rail 42 between a front end position and a rear end position. This capacity for adjustment allows a longitudinal adjustment of the position of the vehicle seat 2 in a longitudinal direction x.

The longitudinal seat adjustment device 3 further comprises at least one locking element 5. In this case, each rail pair 4 can comprise an associated locking element 5. In particular, for each upper rail 41 and vehicle seat 2, an associated locking element 5 is provided. By means of the locking element 5, a movement of the upper rail 41 relative to the lower rail 42, in particular in the lower rail 42, is blocked. For example, the locking element 5 is in the form of a locking plate or pivot plate.

The respective vehicle seat 2 is releasably fixed to the associated rail pair 4, particularly to the upper rail 41, by means of fixing elements 51, particularly locking hooks or claws.

The respective vehicle seat 2, in particular the longitudinal seat adjustment device 3, has a drive unit 22, in particular an electric actuating motor. The vehicle seat 2 is displaceably supported along the rail pairs 4 which are associated with the vehicle seat 2 by means of the drive unit 22. In this case, the drive unit 22 is integrated in the vehicle seat 2. For example, the drive unit 22 can be arranged under a seat face 22 of the vehicle seat 2. FIG. 1 schematically illustrates the drive unit 22 as a block diagram above the seat face in order to illustrate the electrical connection in a simplified manner. This position is not the assembly position of the drive unit 22. Alternatively, the drive unit 22 can be arranged in the region of the lower rail 42 (not illustrated in greater detail).

The drive unit 22 and additional seat components 73.1 to 73.*n* which are arranged in the vehicle seat 2, in particular electronic ones, can be connected via a contacting apparatus 6 which is described below in detail electrically and/or in technical signal terms to an electrical energy supply unit 71 and/or to at least one control unit 72 of the vehicle 1, in particular a so-called vehicle signal on-board network.

For example, the seat components 73.1 to 73.*n* are an electrical seat heating unit, an electrical coupling unit for a mobile terminal, a number of electronically actuatable airbags which are integrated in the vehicle seat 2 and/or other electrical and/or electronic components.

The drive units 22 and/or the electronic seat components 73.1 to 73.*n* of the vehicle seats 2 are connected via a respective associated line set 7 to the electrical energy supply unit 71 and/or the at least one control unit 72. For example, the drive units 22 and/or the electronic seat components 73.1 to 73.*n* can be connected to an electronic on-board network by means of the respective line set 7. In this case, the drive units 22, the electronic seat components 73.1 to 73.*n*, the electrical energy supply unit 71 and the control unit 72 are components of the on-board network.

The electrical line set 7 can be partially arranged in a so-called cable cartridge 8 in accordance with a position of the respective vehicle seat 2. In this case, by means of the cable cartridge 8 a length of the line set 7 in accordance with a position of the vehicle seat 2 can be adjusted. It is thereby possible to avoid as far as possible the line set 7 being arranged loosely in the vehicle 1. Consequently, an obstacle for passengers climbing in and out as a result of loosely extending lines is avoided.

In order to avoid as far as possible a workshop having to be visited in order to remove and/or re-fit at least one of the vehicle seats 2 or in order to rotate at least one of the vehicle seats 2 through 180°, the contacting apparatus 6 which is configured as described below is provided. In this case, at least one complementary component of such a contacting apparatus 6 is arranged on each of the vehicle seats 2 of the second and third seat rows S1, S2.

The contacting apparatus 6 constitutes a so-called cable connection unit, in particular a plug/socket arrangement, in particular a pin type plug/pin type socket arrangement.

Figure 2:
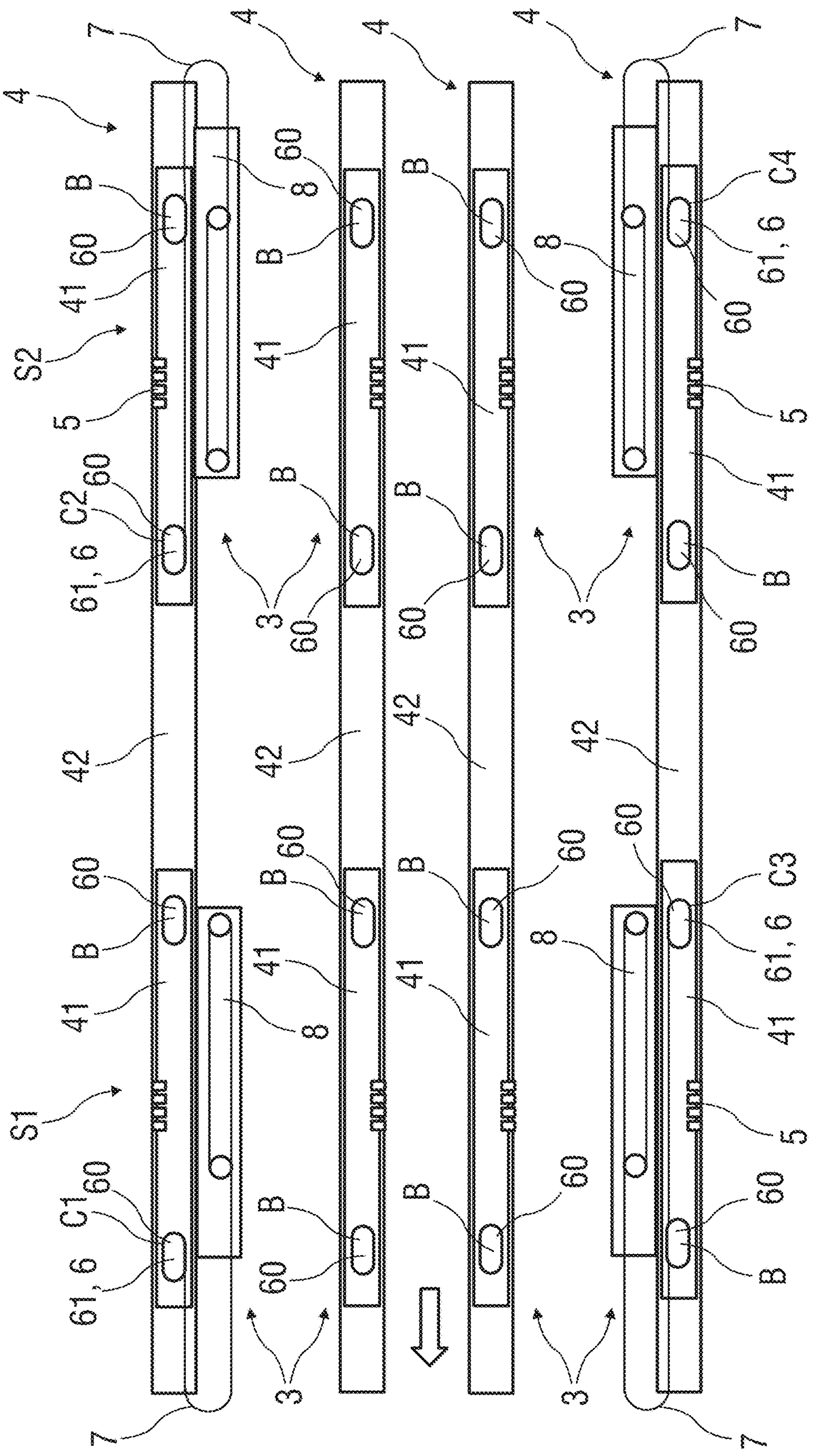

FIG. 2 illustrates four rail pairs 4, wherein the respective lower rail 42 is configured continuously for both seat rows S1, S2. Instead of four rail pairs 4, it is also possible for only two rail pairs 4 or only one rail pair 4 with a plurality of seat rows S1, S2 in the longitudinal direction x with one vehicle seat 2 per seat row S1, S2 to be provided.

The contacting apparatus 6 comprises, for example, a socket 61 and a plug 62 as complementary components. For example, the socket 61, as shown in FIGS. 1 and 2, can be arranged on the upper rail 41. The plug 62 of the contacting apparatus 6 is, as illustrated in FIG. 1, then arranged on the vehicle seat 2. The arrangement of the plug 62 and socket 61 can also be carried out in a transposed manner.

The line set 7 comprises a plurality of line regions 7.1 to 7.3, as illustrated in FIG. 1.

A first line region 7.1 is provided on the seat. The first line region 7.1 extends between the contacting apparatus 6, in the example according to FIG. 1, between the plug 62 and at least one or more components on the seat, such as the drive unit 22 and/or the electronic seat components 73.1 to 73.*n*, in particular a seat heating unit, a massage unit and/or an adjustment unit.

A second line region 7.2 extends in the region of the longitudinal seat adjustment device 3. A free end of the second line region 7.2 is connected to the socket 61 of the contacting apparatus 6 and an opposite free end is arranged in the cable cartridge 8 so as to be able to be rolled or wound up or, conversely, unrolled or unwound. The second line region 7.2 is partially arranged in the upper rail 41, in particular arranged in a guided manner.

The socket 61 is arranged securely on the upper rail 41 and acts as a carrier for the second line region 7.2.

The cable cartridge 8 acts as a cable storage device. In this case, the second line region 7.2 is variable in terms of length as a result of the adjustment of the upper rail 41 relative to the lower rail 42 by the second line region 7.2 also carrying out the movement of the upper rail 41. In this case, for example, the length of the second line region 7.2 is either increased during the unwinding or unrolling or decreased during the winding or rolling up.

The cable cartridge 8 and the second line region 7.2 are, for example, configured in such a manner that the second line region 7.2 can carry out a line path or cable path greater than 1300 mm.

For processing and guiding the second line region 7.2, in particular for pulling in, rolling up or winding up or, conversely, for pulling out, unrolling or unwinding, the cable cartridge 8 comprises guide elements, for example, at least one redirecting roller 81 and at least one line deposit unit 82 (illustrated in FIG. 1), for example, a roller.

The free end of the second line region 7.2 in the cable cartridge 8 is further connected to a third line region 7.3, for example, coupled via a plug type connection. The third line region 7.3 produces the connection with respect to the other components, in particular components which are remote from the seat, for example, on the vehicle, such as the energy supply unit 71 and/or one or more of the control units 72.

FIG. 2 further shows a number of unoccupied regions B on the respective upper rail 41, wherein each of these regions B constitutes a place holder for a possible arrangement of a socket 61 of the contacting apparatus 6. In the example shown, the place holders which are provided with a socket 61 are denoted as occupied regions C1 to C4. Unoccupied place holders are denoted as regions B. In other words, the respective upper rail 41 comprises unoccupied regions B which can additionally be provided with a socket 61. Depending on the orientation of the vehicle seat 2 during assembly on the upper rail 41, the plug 62 can then be inserted into one of the sockets 61 which correspond to this orientation and assembly in the upper rail 41 in order to produce the above-described electrical connection. A vehicle seat 2 can also comprise a plurality of contacting apparatuses 6 in accordance with the drive units 22 fitted in the vehicle seat 2 and/or electronic seat components 73.1 to 73.*n*. In this case, for example, two contacting apparatuses 6 can be provided per vehicle seat 2 by corresponding plug type connections of sockets 61 and plugs 62 and consequently two occupied regions C1 per vehicle seat 2 (not illustrated in greater detail). In the exemplary embodiment according to FIG. 2, four vehicle seats 2 are provided with a contacting apparatus 6 in the associated occupied region C1 to C4.

The occupied regions C1 to C4 and the unoccupied regions B of each upper rail 41 are configured identically. For example, the occupied regions C1 to C4 and the unoccupied regions B are openings 41.1 in the form of elongate openings in a lower region of the upper rail 41, in which openings the plug 62 or the socket 61 can be inserted, in particular plugged through.

In other words, the upper rails 41 of all the vehicle seats 2 in the vehicle 1 can consequently be configured identically. For example, the respective upper rail 41 comprises at the ends identical openings 41.1, which are, for example, in the form of elongate openings, for receiving the plug 62 or the socket 61. Such an identical configuration of the upper rails 41 can be produced simply and cost-effectively.

FIGS. 3 to 8 show the contacting apparatus 6 or the components thereof in a first embodiment.

Figure 3:
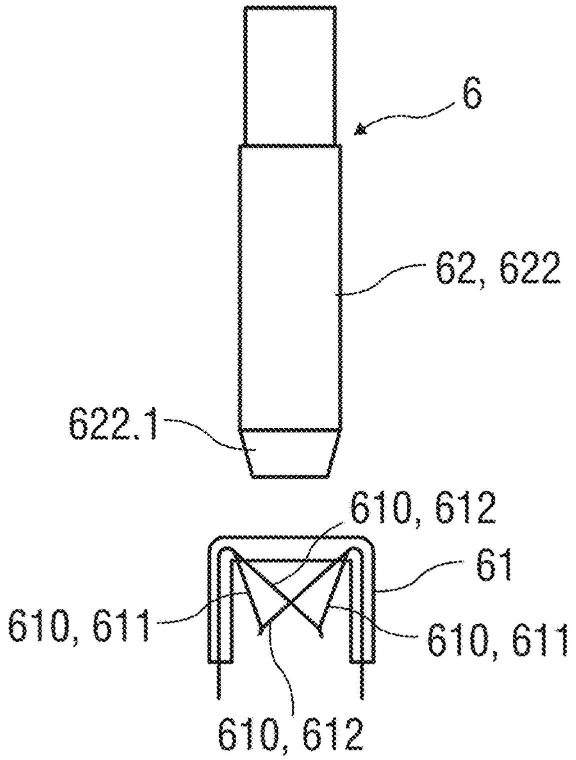

FIG. 3 shows an exploded illustration of the contacting apparatus 6 in the first embodiment in the non-inserted state, wherein the plug 62 is spaced apart from the socket 61. The plug 62 can comprise a positioning element 622. The free end 622.1, which faces the socket 61, of the positioning element 622 can be configured in a chamfered manner. The plug 62 can comprise as contact connections contact pins 621 and/or contact elements 625 (illustrated in FIG. 5).

Figure 7:
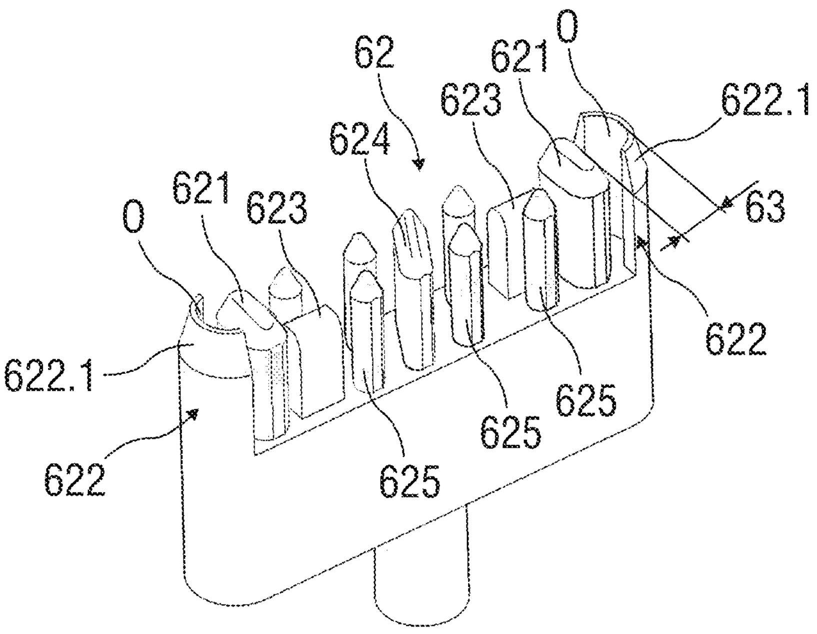

The positioning elements 622 which project, particularly perpendicularly, from the plug 62 are configured to be higher by a particularly predetermined distance 63 (also referred to as an excess dimension) with respect to the contact connections which project from the plug 62, in particular the contact pins 621 and the contact elements 625, as shown, for example, in FIG. 7.

Figure 6:
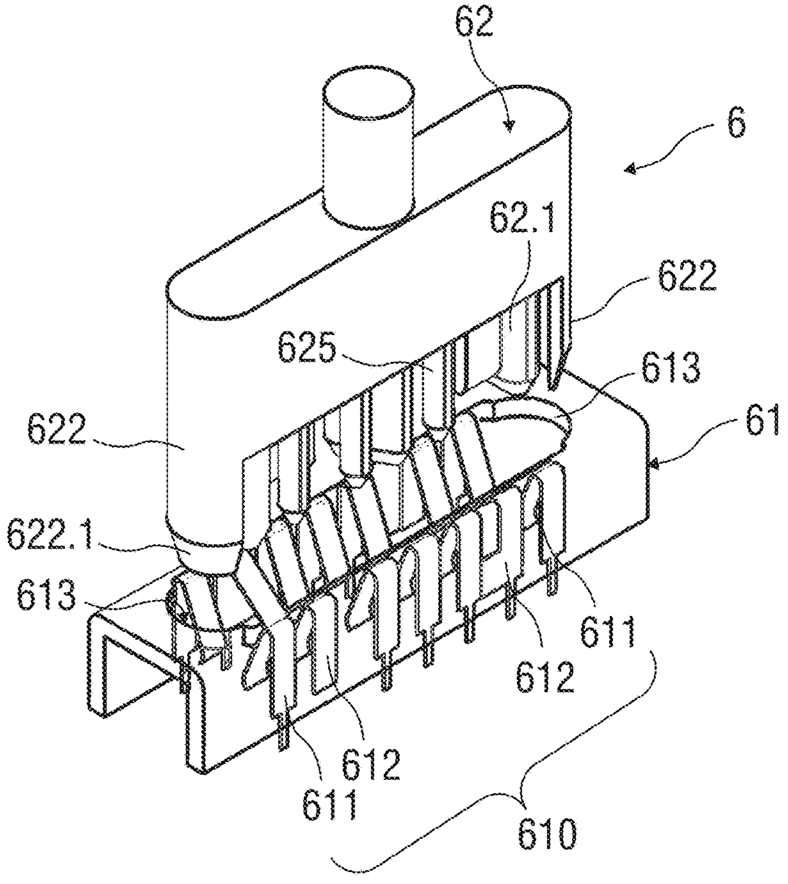

This distance 63 or the excess dimension of the positioning elements 622 can be configured in such a manner that engagement and guiding of the positioning elements 622 in the complementary positioning receiving members 613 (illustrated in FIG. 4) in a region between the plug 62 and socket 61 are provided before the contact connections, in particular the contact pins 621 and the contact elements 625 with the contact counter-elements 610, in particular the metal elements 611, sleeve-like metal elements 612, engage one in the other, in particular before they contact each other, as shown, for example, in FIG. 6.

The respective positioning element 622 can be configured in a chamfered manner for better introduction into the positioning receiving member 613 at the free end 622.1 thereof.

The socket 61 substantially has a U-shaped cross section, wherein a lower side is configured to be open in order, for example, to avoid accumulations of dust in the socket 61, as shown in FIG. 6.

Furthermore, the socket 61 may have as contact connections a number of metal elements 611, 612 as contact counter-elements 610 which are, for example, in the form of metal plates or metal lugs or metal panels, and bent, in particular bent in a v-shaped manner. In this case, the bent metal elements 611, 612 project into an opening of the socket 61 in the direction of the lower side. The metal elements 611, 612 are, for example, introduced in the form of electrical contact counter-elements 610 by means of an injection-molding method into the socket 61, in particular partially injection-molded. The free ends, which project in particular into a receiving space of the socket 61, of the metal elements 611, 612 act as electrical contact counter-elements 610.

Figure 4:
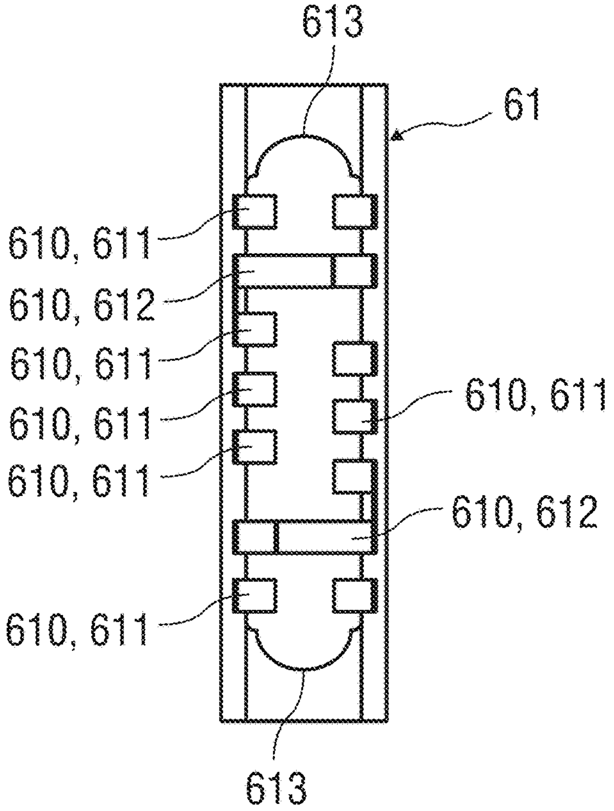

FIG. 4 shows a plan view of the socket 61 with inwardly bent contact counter-elements 610 of the metal elements 611, 612. In addition, the socket 61 may have positioning receiving members 613 which complement the positioning elements 622 of the plug 62. The positioning receiving members 613 are configured in such a manner that the complementary positioning elements 622 is insertable in a guided manner. When the plug 62 and socket 61 are joined together, in particular plugged together, the at least one positioning element 622 and the at least one positioning receiving member 613 engage in each other before the contact connections of the plug 62 and socket 61 engage in each other, particularly before they contact each other.

Figure 5:
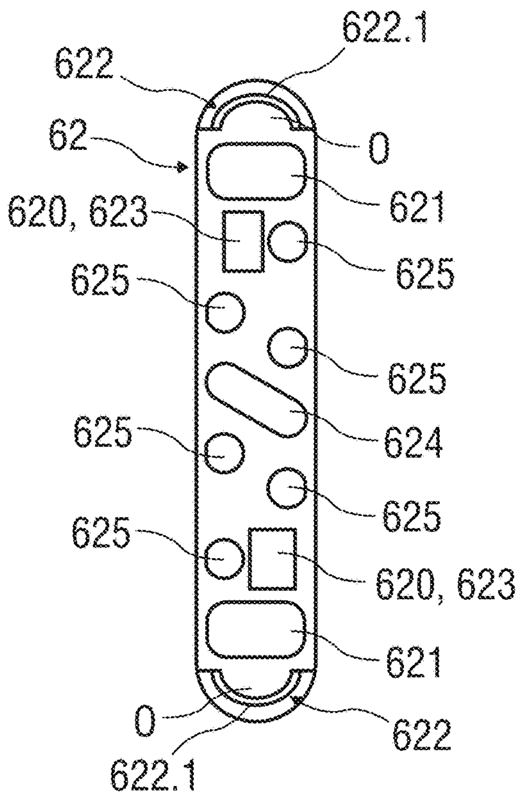

FIG. 5 shows a plan view of the plug 62 with the contact pins 621 and contact elements 625 which are in the form of contact connections, whereas FIG. 6 shows a perspective exploded view of the contacting apparatus 6 in the first embodiment in the non-inserted state. The complementary positioning elements 622 and the positioning receiving member 613 are formed at the ends at opposite ends of the plug 62 and the socket 61.

Figure 8:
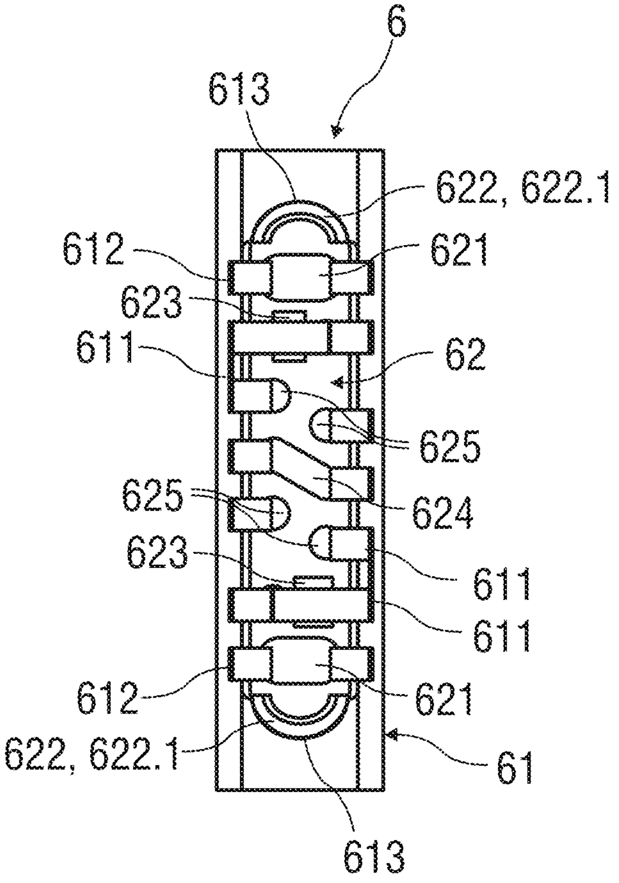

A perspective view of the plug 62 is shown in FIG. 7 and a partially transparent view of the contacting apparatus in the first embodiment in the inserted state is shown in FIG. 8.

The plug 62 comprises, for example, contact pins 621 which are electrical pole contacts. Furthermore, the plug 62 can comprises short-circuit bar pins 623 and additional contact elements 625.

The metal elements 611 of the socket 61, which are associated with the contact pins 621, that is to say, the electrical poles, of the plug 62, in particular the contact counter-elements 610, can have greater dimensions, particularly with respect to a length, than the contact counter-elements 610 in the form of the other metal elements 612.

The metal elements 611, 612 of the socket 61 as contact counter-elements 610 are pretensioned in the plug 62 inserted therein and thereby bear against the contact pins 621 and/or the contact elements 625 in an optimized manner so that contacting both for electrical power supply and for signal transmission is produced in an optimized manner.

Furthermore, as a result of the configuration of the metal elements 611, 612, a tolerance compensation with respect to deviating dimensions and/or positioning of the contact pins 621, the short-circuit bar pins 623 and the additional contact elements 625 of the plug 62 can be carried out. The contact counter-elements 610 are, for example, resilient or resiliently loaded elements which are of planar form. In this case, the contact counter-elements 610 have particularly wide and bent contacting faces. The contact counter-elements 610 can also be referred to as contact pads, contact strips or contact tongues. There may be provided per contact pin 621 or contact element 625 two contact counter-elements 610 which are arranged opposite each other and with spacing from each other. The respective contact pin 621 and/or the respective contact element 625 engage(s) in the inserted state of the contacting apparatus 6 into a space which is formed between the two contact counter-elements 610, in particular a contact region.

As a result of the bent contacting faces of the contact counter-elements 610, a force in the contact region between the contact counter-elements 610 and the contact pins 621 and/or the contact elements 625 is increased so that a reliable electrical contacting is produced. In this case, the contact pins 621 and/or the contact elements 625 of the plug 62 are in the form of rigid connection elements and the contact counter-elements 610 of the socket 61 are in the form of flexible electrical connection elements.

The plug 62 of the contacting apparatus 6 in the first embodiment has the two contact pins 621 which are arranged in the region of a respective narrow side of the plug 62 and consequently opposite each other.

In a plan view, the plug 62 has an oval shape, wherein there are formed at the respective narrow side circular-arc-like extensions which act as positioning elements 622, in particular for positioning the plug 62 relative to the socket 61. The positioning elements 622 are of circular-arc-like form, whereby a circular arc opening O is formed. The respective circular arc opening O is in this case directed in the direction of the contact pins 621 and contact elements 625 of the plug 62. The positioning elements 622 are configured to be chamfered at the free ends 622.1 thereof.

In particular, the socket 61 and/or the plug 62 is/are configured in such a manner that the positioning elements 622 compensate for a possible offset of individual components, which correspond to each other, of the socket 61 and the plug 62 in order to produce the electrical connection.

Furthermore, the plug 62 comprises a number of additional contact elements 625, in particular for signal transmission. The contact pins 621 have greater dimensions, particularly with respect to the circumference thereof, than the additional contact elements 625.

The contacting apparatus 6 has at least one short-circuit element 620 (illustrated in FIG. 5 by way of example). In particular, the contacting apparatus 6 has a so-called short-circuit bar as a short-circuit protection. In this case, the short-circuit bar is formed by means of short-circuit elements 620 in the form of short-circuit bar pins 623. The short-circuit elements 620 are provided on the plug. These short-circuit bar pins 623 have with respect to their height dimensions which are selected to be smaller than at least those of the two contact pins 621 which form the electrical poles, and the additional contact elements 625. It is possible to ensure as far as possible with the selected dimensions that the short-circuit bar opens after contacting of the contact pins 621 so that a current circuit can be produced between the plug 62 and socket 61.

Figure 10:
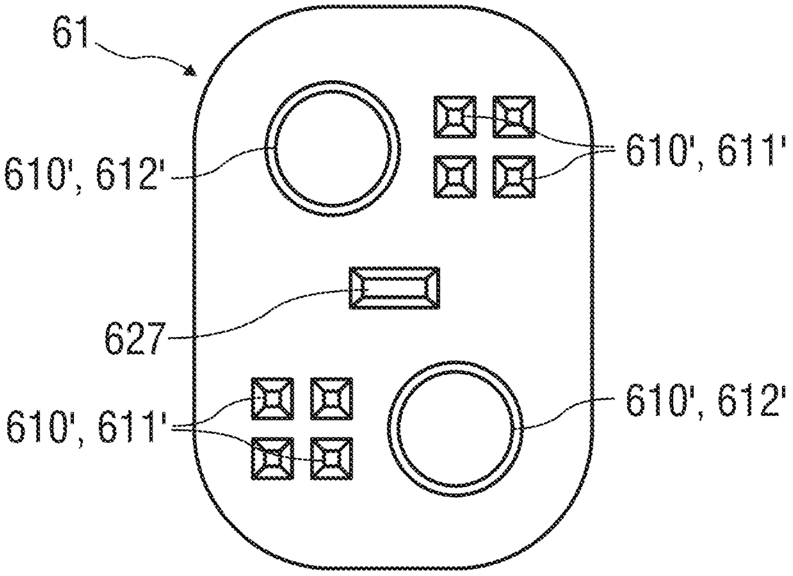

Furthermore, the plug 62 has a rotation prevention member 624 which corresponds to a rotation prevention counter-member 627 of the socket 61 as illustrated in FIG. 10 so that an orientation of the plug 62 during insertion thereof into the socket 61 is predetermined. By means of the rotation prevention member 624 and the rotation prevention counter-member 627, therefore, it can be excluded as far as possible that the plug 62 can be inserted into the socket 61 in a manner other than as predetermined.

If the plug 62 is inserted into the socket 61, there is further provision for an insertion depth of the contact pins 621 and/or the contact elements 625 to be detected with respect to the contact counter-elements 610 of the socket 61. In particular, the insertion depth is established on the basis of an integrated interrogation, for example, one carried out by sensors. Alternatively or additionally, the insertion depth is detected on the basis of additional auxiliary insertion elements which are arranged on the socket 61 and/or the plug 62 and which are passive and not illustrated in greater detail and which correspond to the respective counter-elements. There may also be provision for the detection of the insertion depth to be carried out on the basis of a produced current flow between the socket 61 and plug 62 and/or on the basis of a quality of a signal transmission.

As described above, the two contact pins 621 are used for a current supply of the drive unit 22, whereas contact elements 625 of the plug 62 are provided in particular for signal transmission, in particular for transmitting control signals, for example, for the drive unit 22.

In an alternative embodiment, there is provision for the contact pins 621 or the contact elements 625 to be configured with the corresponding contact counter-elements 610 both for power supply and for signal transmission.

In another alternative embodiment, the positioning elements 622 are configured for power supply and signal transmission so that the contact pins 621 and the contact elements 625 are not necessary on the plug 62 and can consequently be dispensed with.

Figure 9:
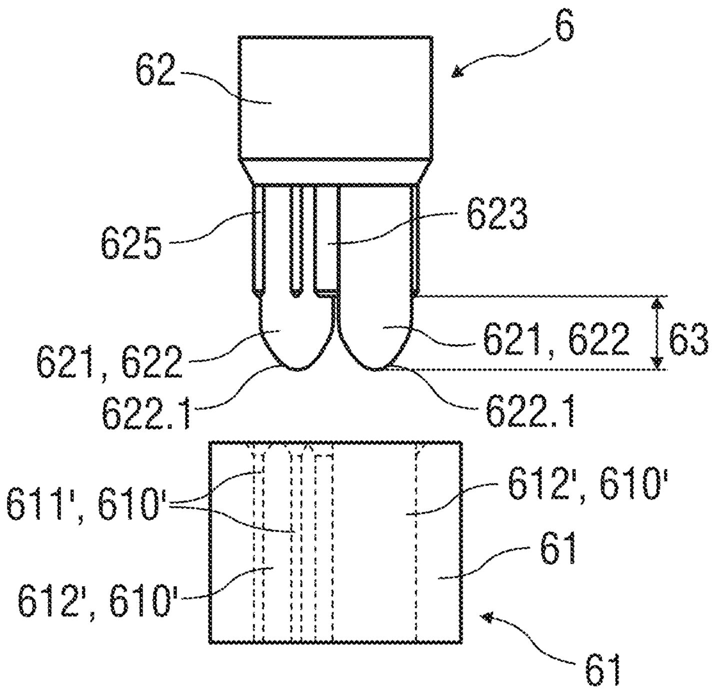
Figure 11:
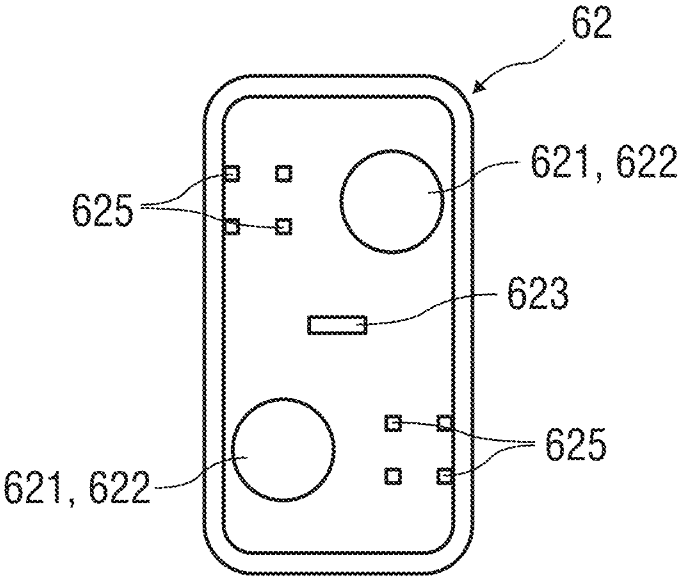
Figure 12:
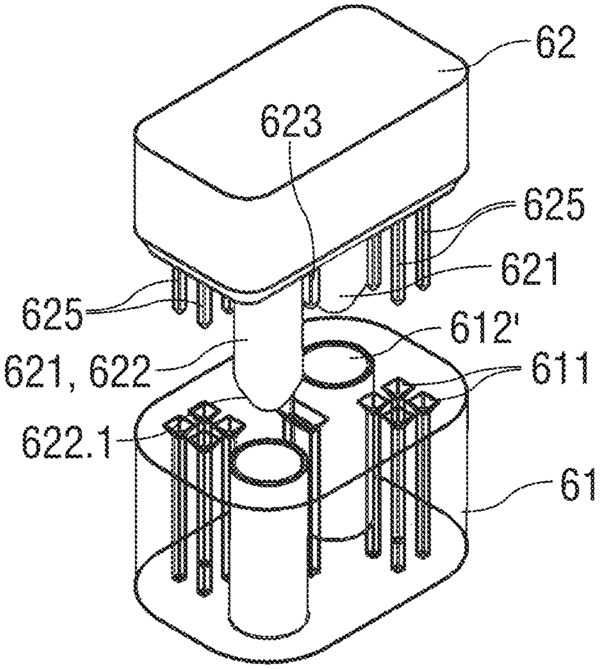
Figure 13:
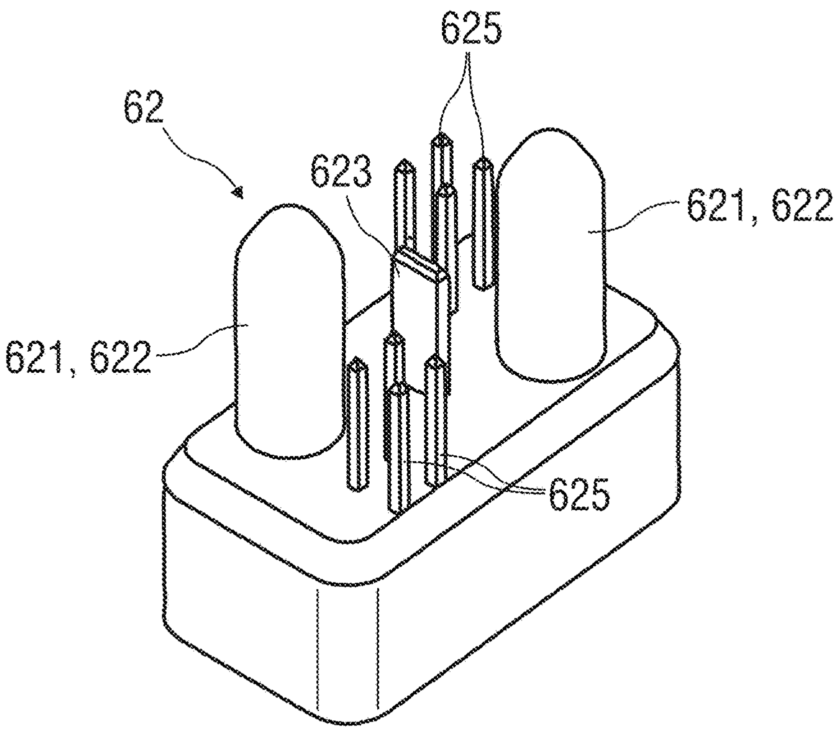
Figure 14:
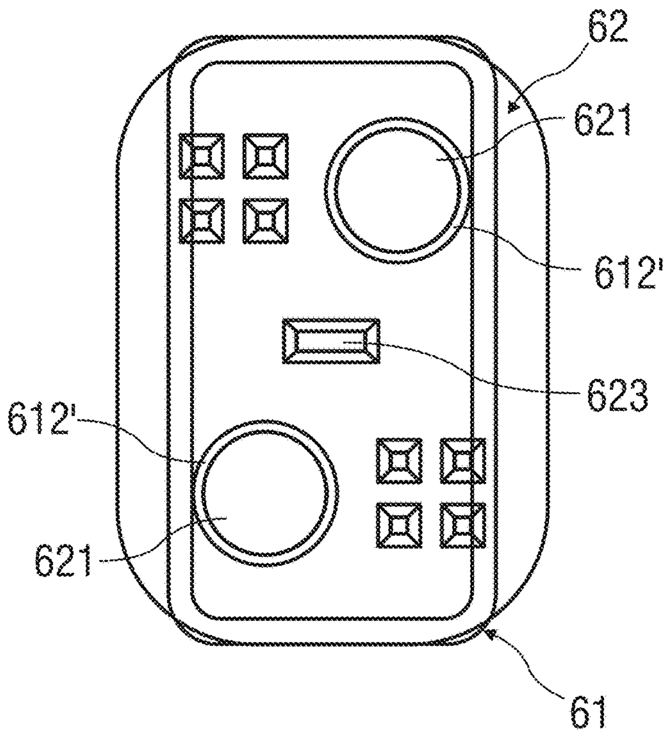

FIGS. 9 to 14 show the contacting apparatus 6 in a second embodiment. In this case, FIG. 9 shows a view of the contacting apparatus 6 in the second embodiment in the non-inserted state. FIG. 10 shows a view of the socket 61 of the contacting apparatus 6, FIG. 11 shows a view of the plug 62, FIG. 12 shows a perspective view of the plug 62 which is spaced apart from the partially transparently illustrated socket 61, FIG. 13 shows a perspective view of the plug 62 and FIG. 14 shows a view of the contacting apparatus 6 with the plug 62 which is inserted into the partially transparently illustrated socket 61.

In the second embodiment of the contacting apparatus 6, the plug 62 has two contact pins 621 which are round in cross section for power supply and which are diagonally opposite each other. The additional contact elements 625, each in the form of a group of four contact elements 625, are arranged laterally beside the respective contact pin 621, as shown particularly in FIG. 11. In this case, the contact elements 625 are arranged in the manner of a square.

In the second embodiment, the contact pins 621 also have with respect to the circumference thereof greater dimensions, in particular a greater length, than the additional contact elements 625. In this case, the contact pins 621 can act as an auxiliary positioning member for inserting the plug 62 into the socket 61 and consequently form positioning elements 622. In particular, the contact pins 621 which are in the form of positioning elements 622 are configured to be higher by an associated distance 63 than the contact elements 625 and the short-circuit bar pin 623.

Consequently, the short-circuit bar pin 623 and the contact elements 625 contact the sleeve-like metal elements 611' of the socket 61 only when the contact pins 621 are inserted by a predetermined dimension, the above-mentioned distance 63 (also referred to as the excess dimension or height distance) into a sleeve-like metal element 612' which is associated with the respective contact pin 621 as a contact counter-element 610'.

In comparison with the first embodiment of the contacting apparatus 6, the socket 61 and the plug 62 are configured to be wider in the second embodiment and shorter with respect to the longitudinal extent.

Furthermore, the plug 62 has the centrally arranged short-circuit bar pin 623 which is configured to be shorter in the longitudinal extent thereof at least than the contact pins 621. It is thereby possible to ensure that the short-circuit bar opens after contact of the contact pins 621 with the respective sleeve-like metal element 612' as a contact counter-element 610'.

Figure 15:
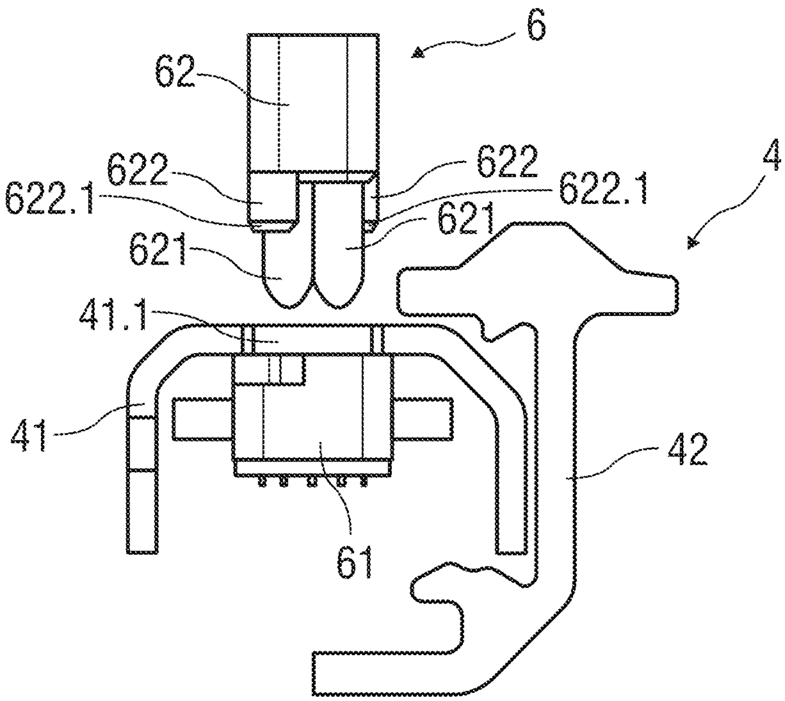

FIG. 15 shows a cutout of a partially sectioned illustration of a rail pair 4, the longitudinal seat adjustment device 3 with a plug 62 and a socket 61 in a third embodiment of the contacting apparatus 6. The socket 61 is fixed at an inner side of the upper rail 41. The upper rail 41 is movably arranged in the lower rail 42 which is in the form of a U-shaped profile. The upper rail 41 is also in the form of a U-shaped profile, wherein the two rails 41, 42 are inserted one in the other with the legs thereof. The plug 62 is arranged from above through the opening 41.1 between the two legs of the lower rail 42 on a base of the upper rail 41 in the region of the socket 61. The upper rail 41 has corresponding openings 41.1 or apertures in the base so that the contact pins 621 and the contact elements 625 are insertable through the openings 41.1 or apertures in the base of the upper rail 41 into the sleeve-like metal elements 611' to 612' as contact counter-elements 610' of the socket 61.

Figure 16:
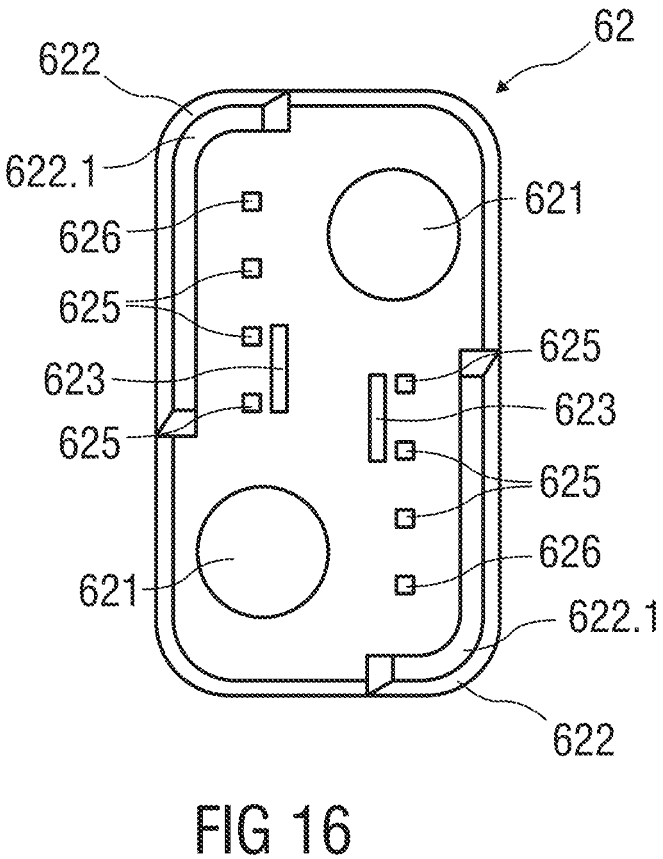

A plug 62 of the third embodiment of the contacting apparatus 6 is illustrated in FIG. 16 in greater detail.

The plug 62 has two diagonally arranged contact pins 621, two positioning elements 622, two short-circuit bar pins 623, six contact elements 625 and two so-called dummy pins 626. The contact elements 625 are arranged in a row with the dummy pins 626, wherein a row comprises three contact elements 625 and one dummy pin 626.

A short-circuit protection is provided by means of the short-circuit bar pins 623, wherein a short-circuit bar can be activated by means of the dummy pins 626. Particularly if the plug 62 is removed from the socket 61, the short-circuit bar is no longer interrupted by the dummy pin 626 so that the short-circuit bar is closed and a short-circuit protection is activated.

The socket 61 of the contacting apparatus 6 in the third embodiment is configured to correspond to the plug 62.

The positioning elements 622 project as a partial extension, in particular wall portions, from the plug 62 and extend over a corner region, wherein the positioning elements 622 are also arranged diagonally opposite each other. The free ends 622.1 of the projecting wall portions are chamfered. The two short-circuit bar pins 623 are arranged in a virtually centered manner and are partially opposite each other. In addition, the contact pins 621 can be in the form of positioning elements 622 with a chamfered free end 622.1.

Figure 17:
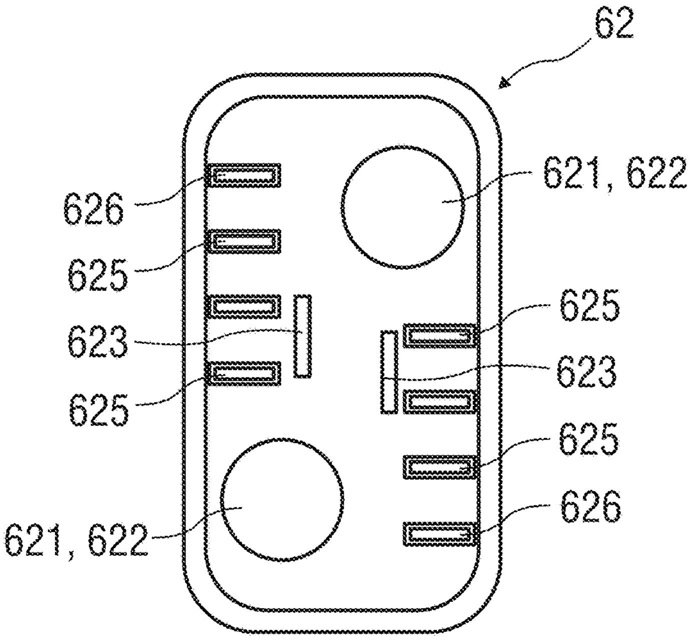

FIG. 17 shows a plug 62 of the contacting apparatus 6 in a fourth embodiment.

In this case, the contact elements 625 and the dummy pins 626 are of elongate form and, in this embodiment, no positioning elements 622 are provided.

Figure 18:
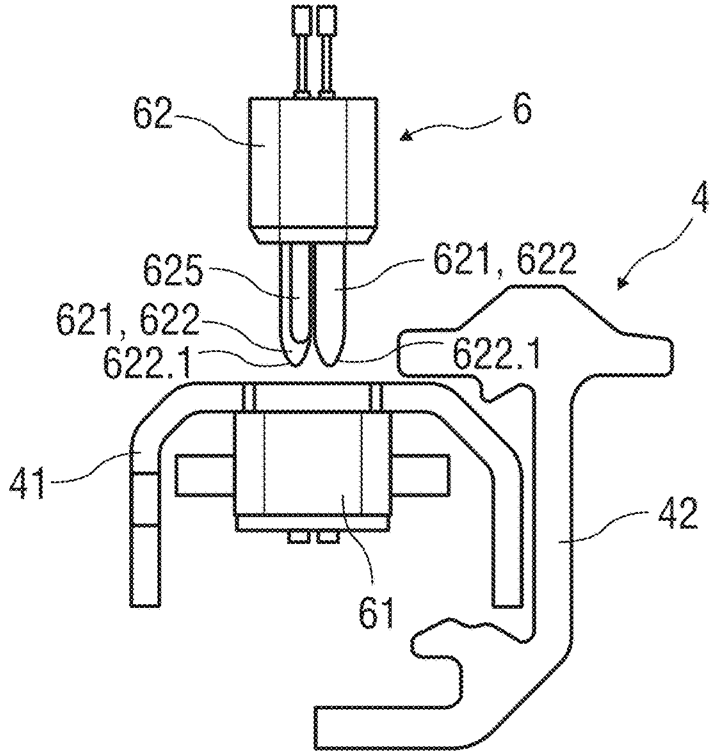

FIG. 18 shows a cutout of a partially sectioned illustration of a rail pair 4 of the longitudinal seat adjustment device 3 with a plug 62 and a socket 61 in a fifth embodiment of the contacting apparatus 6.

Figure 19:
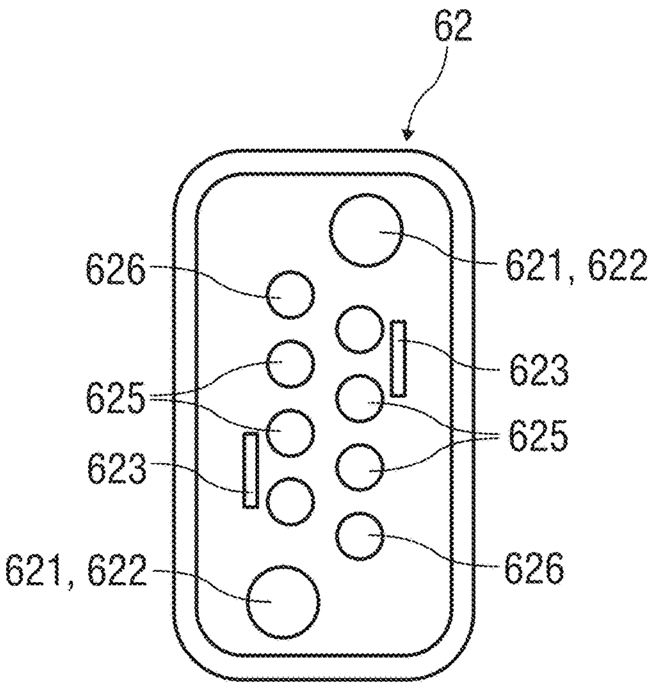
Figure 20:
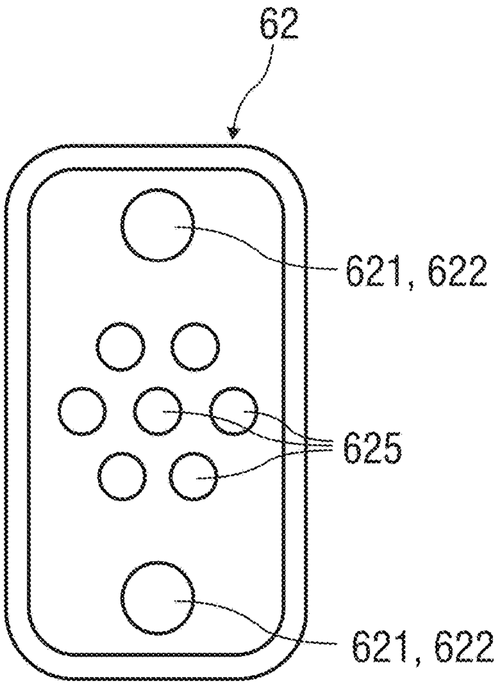
Figure 21:
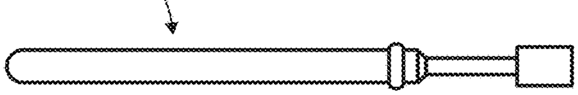

The plug 62 in the fifth embodiment of the contacting apparatus 6 is illustrated in FIG. 19 and a plug 62 in a sixth embodiment of the contacting apparatus 6 is illustrated in FIG. 20. In the fifth embodiment and sixth embodiment, the contact elements 625 or at least a specific number of the contact elements 625 is/are configured in a resiliently loaded manner. Such a resiliently loaded contact element 625 is shown in FIG. 21. Additionally, the contact pins 621 can be in the form of positioning elements 622 with a chamfered free end 622.1 (shown in FIG. 18).

LIST OF REFERENCE NUMERALS

1 Vehicle
2 Vehicle seat, seat
21 Vehicle body
22 Drive unit
3 Longitudinal seat adjustment device
4 Rail pair
41 Upper rail
41.1 Opening
42 Lower rail
5 Locking element
51 Fixing element
6 Contacting apparatus
61 Socket
610, 610' Contact counter-element
611, 612 Metal element
611', 612' Sleeve-like metal element
613 Positioning receiving member
62 Plug
620 Short-circuit element
621 Contact pin
622 Positioning element
622.1 Free end
623 Short-circuit bar pin
624 Rotation prevention member
625 Contact elements
626 Dummy pin
627 Rotation prevention counter-member

63 Distance
7 Line set
7.1 to 7.3 Line region
71 Energy supply unit
72 Control unit
73.1 to 73.*n* Seat component
8 Cable cartridge
81 Redirecting roller
82 Line deposit unit
B Unoccupied region
C1 to C4 Occupied region
O Circular arc opening
S1, S2 Seat row
x Longitudinal direction
y Transverse direction
Z Vertical direction

The invention claimed is:

1. A vehicle seat, comprising:

a drive unit, a longitudinal seat adjustment device having at least one rail pair for longitudinally adjusting the seat, and a contacting apparatus at least for electrically connecting the drive unit, a number of seat components, at least one control unit and/or an electrical energy supply unit, wherein the rail pairs each have a lower rail and an upper rail and the upper rail is movable relative to the lower rail, wherein the contacting apparatus comprises as complementary components at least one plug and one socket having a number of corresponding contact connections, wherein the socket is arranged on the movable upper rail and the plug is arranged on the seat, or vice versa, and wherein, when the plug is inserted in the socket, at least one of the electrical connections between the electrical energy supply unit, the at least one control unit, the drive unit and/or one of the seat components is produced, wherein the contacting apparatus comprises in a region between the plug and socket at least one positioning element and/or a short-circuit element, and wherein the respective positioning element is configured in a circular-arc-like manner with a circular arc opening which is directed in the direction of the contact connections.

2. The seat as claimed in claim 1, wherein the positioning element is insertable in at least one positioning receiving member.

3. The seat as claimed in claim 2, wherein the plug has the at least one positioning element and the socket has the at least one positioning receiving member, or vice versa.

4. The seat as claimed in claim 1, wherein the at least one positioning element which projects from the plug or socket is configured to be higher by a distance with respect to the contact connections which project from the plug.

5. The seat as claimed in claim 4, wherein the distance of the at least one positioning element is configured so that engagement and guiding of the at least one positioning element in the positioning receiving member is provided in the region between the plug and the socket before the contact connections engage in each other.

6. The seat as claimed in claim 1, wherein the at least one positioning element is in the form of a pin or stud or a wall portion.

7. The seat as claimed in claim 1, wherein the positioning element of one of the complementary components is formed in a chamfered manner at a free end which faces the other complementary component.

8. The seat as claimed in claim 1, wherein the positioning element is arranged at a narrow side of the plug or the socket.

9. The seat as claimed in claim 1, wherein two positioning elements which are arranged opposite each other on the plug or the socket are provided.

10. The seat as claimed in claim 9, wherein at least the one positioning element is configured to be so high that it forms an extension of a corresponding narrow side.

11. The seat as claimed in claim 1, wherein the short-circuit element has at least one short-circuit bar pin, the height of which is lower than the height of contact pins and/or contact elements.

12. The seat as claimed in claim 1, wherein the plug has a rotation prevention member which corresponds to a rotation prevention counter-member of the socket.

13. The seat as claimed in claim 1, wherein there are provided as contact counter-elements of the socket a number of flexible metal elements which are arranged and/or configured in such a manner that these metal elements contact pins and/or contact elements in a pretensioned manner when the plug is inserted in the socket.

14. A vehicle having at least one seat as claimed in claim 1.

15. A vehicle seat, comprising:

a drive unit, a longitudinal seat adjustment device having at least one rail pair for longitudinally adjusting the seat, and a contacting apparatus at least for electrically connecting the drive unit, a number of seat components, at least one control unit and/or an electrical energy supply unit, wherein the rail pairs each have a lower rail and an upper rail and the upper rail is movable relative to the lower rail, wherein the contacting apparatus comprises as complementary components at least one plug and one socket having a number of corresponding contact connections designed as a number of contact pins and/or a number of contact elements, wherein the socket is arranged on the movable upper rail and the plug is arranged on the seat, or vice versa, and wherein, when the plug is inserted in the socket, at least one of the electrical connections between the electrical energy supply unit, the at least one control unit, the drive unit and/or one of the seat components is produced, wherein the contacting apparatus comprises in a region between the plug and socket at least one positioning element and/or a short-circuit element, and wherein the short-circuit element has at least one short-circuit bar pin, the height of which is lower than the height of the contact pins and/or the contact elements.

16. A vehicle seat, comprising:

a drive unit, a longitudinal seat adjustment device having at least one rail pair for longitudinally adjusting the seat, and a contacting apparatus at least for electrically connecting the drive unit, a number of seat components, at least one control unit and/or an electrical energy supply unit, wherein the rail pairs each have a lower rail and an upper rail and the upper rail is movable relative to the lower rail, wherein the contacting apparatus comprises as complementary components at least one plug and one socket having a number of corresponding contact connections designed as a number of contact pins and/or a number of contact elements, wherein the socket is arranged on the movable upper rail and the plug is arranged on the seat, or vice versa, wherein, when the plug is inserted in the socket, at least one of the electrical connections between the electrical energy supply unit, the at least one control unit, the drive unit and/or one of the seat components is produced, wherein the contacting apparatus comprises in a region between the plug and socket at least one positioning element and/or a short-circuit element, and wherein there are provided as contact counter-elements of the socket a number of flexible metal elements which are arranged and/or configured in such a manner that these metal elements contact the contact pins and/or the contact elements in a pretensioned manner when the plug is inserted in the socket.

* * * * *